United States Patent
Jira

[11] 3,801,123
[45] Apr. 2, 1974

[54] IMPACT ENERGY ABSORBING APPARATUS

[75] Inventor: Arata Jira, Toyota, Japan

[73] Assignee: Toyota Jidosha Kogyo Kabueshiki Kaisha, Toyota-shi, Aichi-ken, Japan

[22] Filed: Aug. 11, 1972

[21] Appl. No.: 279,754

[30] Foreign Application Priority Data
Dec. 8, 1971 Japan.............................. 46-99296

[52] U.S. Cl. ........... 280/87 R, 280/150 AB, 74/492
[51] Int. Cl. ...... B60r 21/08, B62d 1/10, B62d 1/16
[58] Field of Search .......... 280/150 AB, 87 R, 87 A

[56] References Cited
UNITED STATES PATENTS

| | | | |
|---|---|---|---|
| 3,580,603 | 5/1971 | Chute................................ | 280/87 R |
| 3,632,135 | 1/1972 | Chute et al.................... | 280/150 AB |
| 3,744,817 | 7/1973 | Ousset............................. | 280/87 R |
| 2,899,214 | 8/1959 | D'Antini.......................... | 280/87 A |
| 3,600,003 | 8/1971 | Carey............................. | 280/150 AB |

FOREIGN PATENTS OR APPLICATIONS

| | | | |
|---|---|---|---|
| 609,624 | 9/1960 | Italy.............................. | 280/150 AB |

Primary Examiner—David Schonberg
Assistant Examiner—John P. Silverstrim
Attorney, Agent, or Firm—Stevens, Davis, Miller & Mosher

[57] ABSTRACT

Disclosed herein is an impact energy absorbing apparatus of the type which includes an inflatable bag assembly confined within the steering wheel of a vehicle. The inflatable bag assembly comprises a container rotatably mounted on the top end of a steering shaft within the steering wheel so as to be conditioned to a given position independently of steering wheel rotation by way of an eccentric load and an inflatable bag confined within the container in hermetical connection with an external pressure source. A pressure communication device for leading pressurized fluid from the pressure source into the bag comprises a conduit having one end thereof connected to the periphery of a column tube surrounding the steering shaft and the other end thereof connected to the pressure source, an annular sealing device interposed between the periphery of the shaft and the inner circumference of the column tube to hermetically connect the opening of the conduit with an axial passageway within the steering shaft, the passageway having one end thereof open into the bag and the other end thereof closed.

9 Claims, 10 Drawing Figures

PATENTED APR 2 1974

3,801,123

SHEET 1 OF 3 ns of the present invention.

IMPACT ENERGY ABSORBING APPARATUS

BACKGROUND OF THE INVENTION

The present invention relates to a safty apparatus for protecting a driver of a vehicle in occurrence of a vehicle collision, and more particularly to an impact energy absorbing apparatus of the type which includes an impact energy absorbing bag confined within the steering wheel assembly of the vehicle.

There have been introduced several impact energy absorbing apparatuses of this type, but there are still some problems remaining. It is very important to supply pressurized fluid to the inflatable bag by hermetically and smoothly in necessity and preferably by way of a simply constructed device. It is also very important that when the bag is inflated, it should take such a shape as not to disturb the driver's forward sight, not to push the driver's hands off the steering wheel and to sufficiently protect the driver's body so as to prevent the secondary collision of the driver. In the prior art safty apparatuses, however, the inflatable bag rotates in accordance with rotation of the steering wheel and consequently, the bag cannot be inflated in a desired position to achieve out the subject, even if the bag is designed in an ideal shape. So long as a safty apparatus of this type does not fulfill the mentioned functions, the apparatus is considered to be perfect halfway.

SUMMARY OF THE INVENTION

The prime object of the present invention is, therefore, to provide an impact energy absorbing apparatus provided with a pressure communication device suitable for leading pressurized fluid hermetically and smoothly to an inflatable bag in necessity.

Another object of the present invention is to provide an impact energy absorbing apparatus, having the above mentioned characteristics, wherein the inflatable bag is designed to take such a shape when inflated as not to block the driver's forward sight, not to push the driver's hands off the steering wheel and to sufficiently protect the driver's body.

A further object of the present invention is to provide an impact energy absorbing apparatus, having the above mentioned characteristics, wherein the inflatable bag is always conditioned to a certain position independently of steering wheel rotation by way of an eccentric load.

Still another object of the present invention is to provide an impact energy absorbing apparatus, having the above mentioned characteristics, wherein the appartus can be manufactured very simply and applicable to any type of vehicle now in use and yet secures accurate and precise protecting operation.

BRIEF DESCRIPTION OF THE DRAWINGS

The above and other objects, features and advantages of the present invention will become more readily apparent from the following detailed description of the preferred embodiments with reference to the accompanying drawings forming a part of the specificaition.

In the drawings.

DESCRIPTION OF THE PREFERRED EMBODIMENTS

Figure 1:
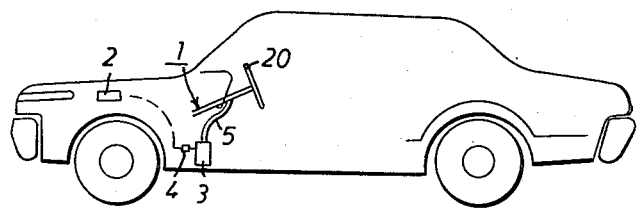
FIG. 1 shows a schematic arrangement of the components of the present invention.

Various types of vehicles can adapt a safty apparatus constructed in accordance with the present invention, and a preferred embodiment is referred to FIG. 1 of the drawings. There is shown in FIG. 1 a general arrangement of the apparatus schematically in relation to an automobile. A steering wheel 20 is supported by a steering column assembly 1 which is connected to a high-pressure gas supply means 3 as an operation fluid source by way of a conduit 5. The gas supply means 3 of a well-known type such as a gas-cylinder mounted on one portion of the vehicle body is activated to let the high pressure gas escape therefrom by operation of a conventional valve opening device 4. A collision senser assembly 2 activates the valve opening device 4 in occurrence of a collision. The collision senser assembly 2 may be one of conventional types such as a sensing device to detect clashing deformation of the vehicle body, a radar senser to detect a collision in advance, etc.

Figure 2:
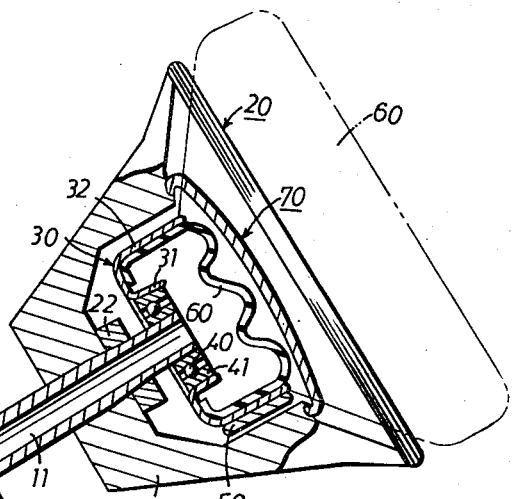
FIG. 2 shows an elevational cross-section of a first preferred embodiment in accordance with the present invention.
Figure 2:
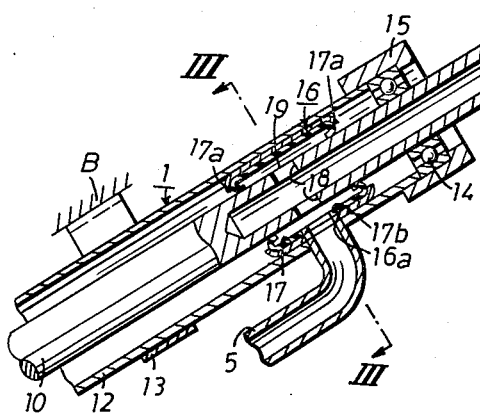
Figure 3:
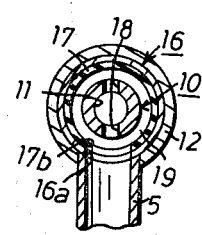
FIG. 3 is a cross-sectional view taken along the III — III line in FIG. 2.

The steering column assembly 1, which is further referred to FIGS. 2 and 3, comprises a column tube 12 firmly mounted on a bracket 13 secured on a portion B of the vehicle body and a steering shaft 10 rotatably coupled in the column tube 12 and journalled by ball-bearings 14. The steering shaft 10 is provided with a gas-passage 11 drilled therethrough along its central axis. The gas-passage 11 is closed at its lower end, while the upper end thereof opens. Radial openings 18 are provided at the lower portion of the gas-passage 11. The ball-bearings 14 are contained in a case 15 clamped on the upper portion of the column tube 12.

An annular retainer 16 having an approximately U-shaped cross-section is interposed between the steering shaft 10 and the column tube 12, the periphery of the retainer 16 being securedly fixed onto the inner circumference of the column tube 12. A sealing member 17 adheres with its periphery to the inner circumference of the retainer 16, the sealing member 17 being designed to have an approximately U-shaped cross-section. The inner edges of the retainer 16 are kept apart from the steering shaft 10 and the sealing member 17 is provided at its both ends respectively with lips 17a and 17a curved inwardly to slidably touch with the periphery of the steering shaft 10. Consequently, an annular chamber 19 is formed inside the sealing member 17. This annular chamber 19 is connected to the gas-passage 11 through the radial openings 18 and is in communication with the conduit 5 through holes 16a and 17b provided respectively through the retainer 16 and the sealing member 17. The conduit 5 is mounted at one end thereof on the periphery of the column tube 12 to be open towards the annular chamber 19, and at the other end thereof connected to the gas supply means 3.

The base portion of the steering wheel 20 is engaged with the top end of the steering shaft 10 and fastened by a locking nut 22. A cylindrical container 30 has at its bottom side an inwardly curved inner edge 31 which is fixed on an outer race 41 of low rotation-resistance ball bearings 40 pressedly secured on the top end of the steering shaft 10. It can well be understood that the container 30 is positioned rotatably at the center of the steering wheel 20. The gas-passage 11 opens into the container 30 and a weight 50 is affixed on the lower periphery of the container 30.

An inflatable bag 60 made of elastic materials such as synthetic resin, natural rubber, etc. is hermetically installed along the inside wall of the periphery 32 of the container 30. The inflatable bag 60 is normally folded in its inoperative position, and will explosively be inflated by high-pressure gas supplied into the container 30 through the gas-passage 11. The inflated bag 60 in its operative position as shown with dotted lines in FIG. 2 works as a shock absorber to protect a driver of the vehicle from dangerous influence in occurrence of a collision. The design of the cushion 60 is so characteristic that when inflated, it takes a shape not to block the driver's forward sight with its upper edge 60a, not to push the driver's hands off the steering wheel 20 with its side rims 60b, 60b and yet to protect the driver, particularly his belly with its lower edge 60d, as well illustrated in FIGS. 4 – 6. A cover member 70 shown in FIG. 2 is detachably mounted on the steering wheel 20 to hold thereunder the container 30 and the bag 60 contracted in its inoperative position, and will get off from the steering wheel 20 when the bag 60 is inflated into its operative position.

Figure 5:
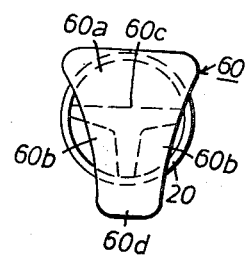
FIGS. 5 and 6 explain relative positions between the inflated bag and the steering wheel.
Figure 6:
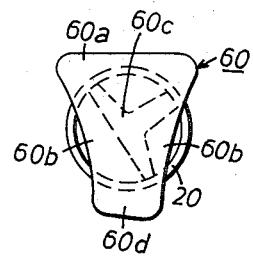

In steering operation by rotation of the steering wheel 20, the steering shaft 10 and the cover member 70 make corresponding rotation. The bag 60 can remain in a given position independently of the rotation of the steering wheel 20 by way of the weight 50 which biases always the container 30 downwardly and the rotatable supporting way of the container 30 journalled on the steering shaft 10 through the ball bearings 40. FIGS. 5 and 6 illustrate that whenever inflated, the bag 60 takes the given position independently of the rotation of the steering wheel 20.

It should be observed that gas will slightly leak through the ball bearings 40 while the bag is inflated in its operative position, but this leakage would cause no problem at all for inflating the bag 60 and maintaining the inflation of the bag 60. The inflated bag 60 absorbs collision force transmitted thereon through the driver by way of getting contracted with the gas leakage through the ball bearings 40.

Figure 7:
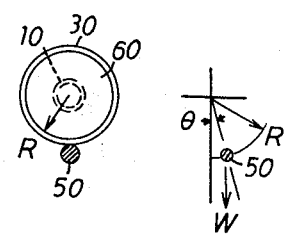
FIG. 7 depicts effective operation of the weight shown in FIG. 2.

In the above preferred embodiment, the volume of the weight 50 can properly be decided in the following manner in reference with FIG. 7.

Volume of the weight 50 — $W$
Radius of the container 30 — $R$
Rotation Resistance of the ball bearings 40 — $T$
Rotation Angle of the container 30 — $\theta$ $$T = W \theta R$$

Therefore, with actual figures of $T$ and $\theta$ which would cause no problem to practical use of the bag 60, the volume of the weight 50 can be determined by $$W = T / (\theta R)$$

Figure 8:
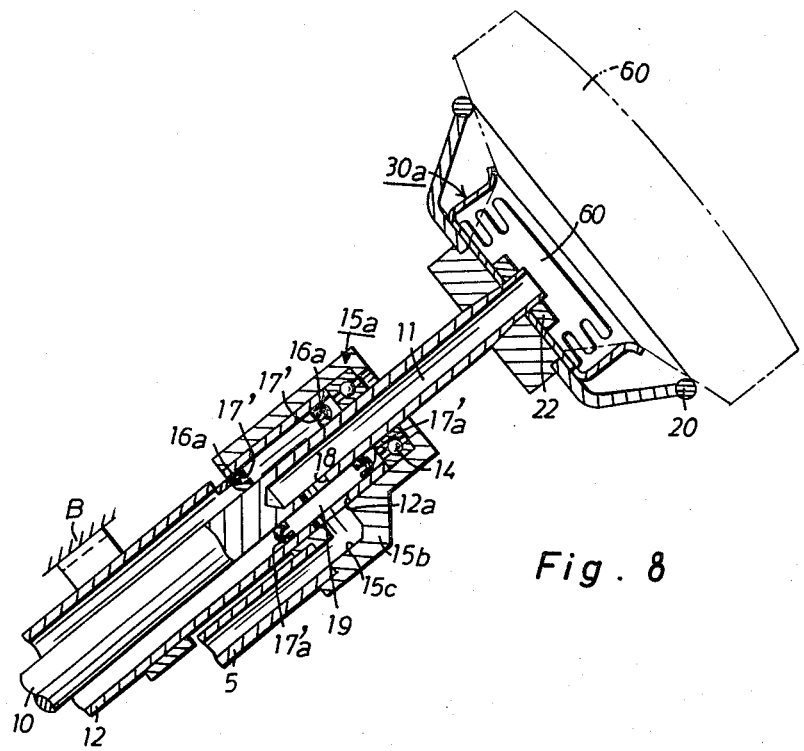
FIG. 8 shows an elevational cross-section of another construction of the high pressure gas-passage shown in FIG. 2.

Reference is now made to FIG. 8, wherein a case 15a clamped on the upper portion of the column tube 12 contains therein the ball bearings 14 to journal the steering shaft 10 rotatably coupled within the column tube 12. The case 15a has an extended skirt portion 15b to have a passage 15c drilled therein and connected to the conduit 5. This passage 15c is in communication with the chamber 19 through a radial hole 12a provided on the column tube 12. A pair of annular retainers 16a, 16 a is interposed between the steering shaft 10 and the column tube 12, the peripheries of the retainers 16a, 16a adhering on the inner circumference of the column tube 12. The retainers 16a, 16a have respectively annular sealing members 17', 17' along the inner circumference thereof, the sealing members 17', 17' having their cross-sections approximately U-shaped. The inner edges of the retainers 16a, 16a are kept apart from the steering shaft 10 and lips 17'a, 17'a of the sealing members 17', 17' touch slidably with the periphery of the steering shaft 10. Consequently, the chamber 19 is formed between the sealing members 17', 17' and connected to the gas passage 11 through the opening 18.

Addtionally, in order to form the chamber 19, the retainers 16a, 16a may be adhered on the periphery of the steering shaft 10 with the lips 17'a, 17'a of the sealing members 17', 17' installed to be expansible toward the inner circumference of the column tube 12.

As shown briefly in FIG. 8 for reference convenience, the bag 60 contracted in its inoperative position may be confined within the container 30a hermetically at the top end of the steering shaft 10 by way of clamping with the locking nut 22 which also fastens the steering wheel 20 at the same position.

Figure 9:
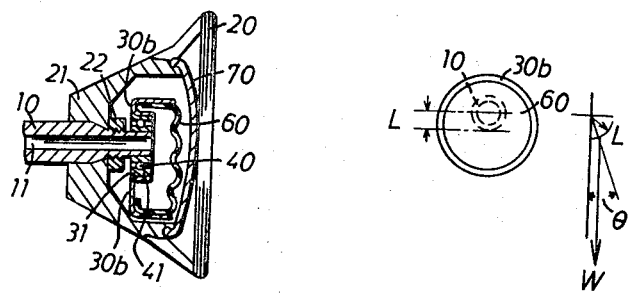
FIG. 9 illustrates a partial elevational cross-section of a second embodiment of the present invention.
Figure 10:
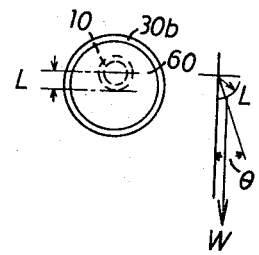
FIG. 10 shows effective operation of the displacement of the container in FIG. 9.

Another preferred embodiment of the present invention is disclosed in FIGS. 9 and 10. This embodiment is characterized in positioning a container 30b which is journalled on the top end of the steering shaft 10 through the ball bearings 40. As well depicted in FIG. 9, the container 30b is positioned eccentrically against the steering shaft 10, the axis passing on the center of gravity of the container 30b being vertically displaced against the axial center of the steering shaft 10. Thus, the weight 50 in the previous embodiment becomes needless but yet the same effect is well obtained in this new embodiment. Other constructions of the new embodiment are just same as those of the previous one and no repeated explanation is made. The same and similar reference numerals indicate the same and similar construction parts.

Figure 4:
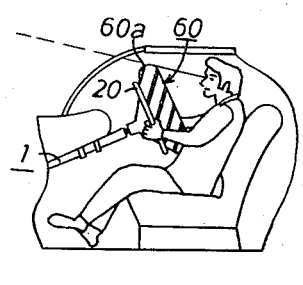
FIG. 4 is a side view when the bag shown in FIG. 2 is inflated to protect the driver.

In steering operation by rotation of the steering wheel 20, which, in turn, rotates the steering shaft 10 and the cover member 70, the container 30b will remain in its original position independently of the rotation of the steering wheel 20 since the center of gravity of the container 30b is held lower than the axial center of the steering shaft 10. And as shown in FIGS. 4 to 6, in occurrence of a collision, the bag 60 will instantly be inflated in the given position to protect the driver. The collision force absorbing effect can, as well, be secured by leackage of the gas through the ball bearings 40.

The volume of the displacement of the container 30b against the steering shaft 10 can be determined in the following manner particularly in reference with FIG. 10.

Weight of the container 30b — $W$
Displacement volume of the container 30b against the steering shaft 10 — $L$
Rotation resistance of the ball bearings 40 — $T$
Rotation angle of the container 30b — $\theta$ $$T = W \theta L$$

Therefore, with actual figures of $T$ and $\theta$ which would cause no problem to practical use of the bag 60, the volume of the displacement of the container 30b can be determined by $$L = T / (W \theta)$$

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an impact energy absorbing apparatus for a vehicle having a steering assembly which is provided with a steering column tube mounted on a body portion of the vehicle, a steering shaft coupled rotatably within said tube, and with a steering wheel secured on the top end of said shaft, a collision senser to detect vehicle collision, an external pressure source for issuing pressure in response with activation of said senser, an inflatable bag assembly confined within said steering wheel, and pressure-communication means for leading the pressure from said source into said bag assembly, the improvement wherein said pressure-communication means comprises a conduit having one end thereof connected to the periphery of said tube and the other end thereof connected to said external pressure source, annular sealing means interposed between the periphery of said shaft and the inner circumference of said tube to hermetically connect the opening of said conduit with an axial passageway drilled within said shaft, said passageway having one end thereof open into said bag assembly and the other end thereof closed, and said inflatable bag assembly comprises a container mounted on the top end of said shaft within said steering wheel and an inflatable bag confined within said container in hermetical connection with said pressure-communication means.

2. An impact energy absorbing apparatus for a vehicle as claimed in claim 1, wherein said conduit is connected at the one end thereof with an opening provided on said tube and is in communication with said axial passageway through said sealing means.

3. An impact energy absorbing apparatus for a vehicle as claimed in claim 1, wherein said conduit is connected at the one end thereof with an opening provided on the skirt portion of a casing secured on the top end of said tube for journalling therein the upper portion of said shaft, and is in communication with said axial passageway through said sealing means.

4. An impact energy absorbing apparatus for a vehicle as claimed in claim 1, wherein said sealing means comprises an annular retainer secured on the inner circumference of said tube and an annular sealing member secured on the inner face of said retainer, said member being provided with a U-shape cross section and a pair of lips, whereby said sealing member forms a hermetic communication chamber for communication between said conduit and said axial passageway by way of said lips contactable with the periphery of said shaft.

5. An impact energy absorbing apparatus for a vehicle as claimed in claim 1, wherein said sealing means comprises a pair of annular retainers secured on the inner circumference of said tube in a way to face to each other and a pair of sealing members secured respectively on the inner faces of said retainers, each of said members being provided with a U-shape cross section and a lip, whereby said sealing members form a hermetic communication chamber for communication between said conduit and said axial passageway by way of said lips contactable with the periphery of said shaft.

6. An impact energy absorbing apparatus for a vehicle as claimed in claim 1, wherein said container is secured at a bottom portion thereof on the outer race of ball bearings fixedly secured on the top end of said shaft, said container being provided with means for conditioning said container to a certain stable position independently of rotation of said shaft.

7. An impact energy absorbing apparatus for a vehicle as claimed in claim 6, wherein said conditioning means is a weight secured on the bottom side of said container.

8. An impact energy absorbing apparatus for a vehicle as claimed in claim 6, wherein said conditioning means is said container itself which is eccentrically mounted on the outer race of said bearings at a bottom portion thereof.

9. An impact energy absorbing apparatus for a vehicle as claimed in claim 6, wherein said inflatable bag confined within said container is designed to take a predetermined shape not to block the driver's forward sight, not to push the driver's hands off said steering wheel and to protect the driver, when inflated to be in its operating position.

* * * * *